(12) United States Patent
Nyamagoudar et al.

(10) Patent No.: US 11,725,710 B2
(45) Date of Patent: Aug. 15, 2023

(54) VARIABLE FLUID DAMPING

(71) Applicant: The Boeing Company, Chicago, IL (US)

(72) Inventors: Vinayak M. Nyamagoudar, Bangalore (IN); Aswin Chandar N C, Bangalore (IN)

(73) Assignee: The Boeing Company, Arlington, VA (US)

( * ) Notice: Subject to any disclaimer, the term of this patent is extended or adjusted under 35 U.S.C. 154(b) by 492 days.

(21) Appl. No.: 16/893,160

(22) Filed: Jun. 4, 2020

(65) Prior Publication Data

US 2021/0381575 A1 Dec. 9, 2021

(51) Int. Cl.
| | | |
|---|---|---|
| *E05F 15/53* | (2015.01) | |
| *F16F 9/53* | (2006.01) | |
| *E05F 3/04* | (2006.01) | |
| *F16F 9/32* | (2006.01) | |
| *F16H 7/06* | (2006.01) | |

(52) U.S. Cl.
CPC ............ *F16F 9/535* (2013.01); *E05F 3/04* (2013.01); *E05F 15/53* (2015.01); *F16F 9/3292* (2013.01); *F16F 9/53* (2013.01); *F16F 9/532* (2013.01); *F16H 7/06* (2013.01); *E05Y 2201/21* (2013.01); *E05Y 2201/448* (2013.01); *E05Y 2400/20* (2013.01); *E05Y 2900/531* (2013.01); *F16F 2222/12* (2013.01); *F16F 2228/066* (2013.01)

(58) Field of Classification Search
CPC .. F16F 9/535; F16F 9/3292; F16F 9/53; F16F 9/532; F16F 2222/12; F16F 2228/066; F16F 2224/045; F16F 2230/24; F16H 7/06; B64C 1/1407; E05F 3/04; E05F 15/53; E05Y 2201/21; E05Y 2201/448; E05Y 2400/20; E05Y 2900/531
See application file for complete search history.

(56) References Cited

U.S. PATENT DOCUMENTS

| | | | |
|---|---|---|---|
| 5,379,971 A | 1/1995 | Kim et al. | |
| 5,468,042 A * | 11/1995 | Heinrichs | E05C 17/305 49/340 |
| 5,687,452 A | 11/1997 | Hamatani et al. | |

(Continued)

FOREIGN PATENT DOCUMENTS

EP     2975293     1/2016

OTHER PUBLICATIONS

Extended European Search Report for European Patent Application No. 21165114.6 dated Sep. 20, 2021.

*Primary Examiner* — Abe Massad
(74) *Attorney, Agent, or Firm* — Kunzler Bean & Adamson (57) ABSTRACT

Disclosed herein is an apparatus for variable fluid damping. The apparatus comprises a mount. The apparatus also comprises a damper coupled to the mount to apply a damping force in response to movement of the mount. The apparatus further comprises an electrical element positioned to correspond to the damper. The apparatus additionally comprises a rheological fluid disposed in the damper. The rheological fluid changes viscosity in response to a change in an output of the electrical element to change the damping force of the damper. The apparatus also comprises a controller to provide input to the electrical element in response to a normal operating condition or an emergency operating condition.

20 Claims, 5 Drawing Sheets

(56) References Cited

U.S. PATENT DOCUMENTS

| | | | | |
|---|---|---|---|---|
| 6,314,612 B1* | 11/2001 | Rennecke | ............... | E05F 5/10 |
| | | | | 188/267.2 |
| 6,880,483 B2 | 4/2005 | Fedders | | |
| 7,168,659 B2* | 1/2007 | Galvani | ............... | B64C 1/1407 |
| | | | | 244/129.5 |
| 8,051,823 B2* | 11/2011 | Spaggiari | ............ | F02B 31/06 |
| | | | | 123/184.61 |
| 8,919,699 B2* | 12/2014 | Kress | ............... | B64C 1/1407 |
| | | | | 244/129.4 |
| 9,453,552 B2* | 9/2016 | Tosovsky | ............. | F16F 9/537 |
| 10,480,237 B2* | 11/2019 | Battlogg | ............. | F16D 57/002 |
| 2006/0202087 A1 | 9/2006 | Mortland | | |
| 2008/0294314 A1* | 11/2008 | Morris | ............... | E05F 5/00 |
| | | | | 701/49 |
| 2009/0007489 A1* | 1/2009 | Kern | ............. | E05C 17/30 |
| | | | | 49/31 |

* cited by examiner

VARIABLE FLUID DAMPING

FIELD

This disclosure relates generally to fluid damping, and more particularly to variable fluid damping.

BACKGROUND

Damping provides dissipation of energy. The dissipation of energy provided by damping can also be applied to provide resistance to motion. Viscous damping is one form of mechanical damping. Viscous damping is achieved by applying a force from a moving component to move a fluid, such as water, oil, or other hydraulic compounds, past a restricting structure. The rate of movement of the fluid past the restricting structure is impeded by a geometry or fluid flow path of the restricting structure. This impediment to the flow of the fluid or resistance to the movement of the fluid translates to a counteracting force providing resistance to motion in the moving component. A quicker movement in the moving component results in a higher level of damping or resistance to that movement.

SUMMARY

The subject matter of the present application has been developed in response to the present state of the art, and in particular, in response to the shortcomings of conventional damping systems, that have not yet been fully solved by currently available techniques. Accordingly, the subject matter of the present application has been developed to provide improved damping that overcomes at least some of the shortcomings of prior art techniques.

Disclosed herein is an apparatus for variable fluid damping. The apparatus comprises a mount. The apparatus also comprises a damper coupled to the mount to apply a damping force in response to movement of the mount. The apparatus further comprises an electrical element positioned to correspond to the damper. The apparatus additionally comprises a rheological fluid disposed in the damper. The rheological fluid changes viscosity in response to a change in an output of the electrical element to change the damping force of the damper. The apparatus also comprises a controller to provide input to the electrical element in response to a normal operating condition or an emergency operating condition. The preceding subject matter of this paragraph characterizes example 1 of the present disclosure.

The electrical element is an electrical coil and the output of the electrical element is a magnetic field generated by the electrical coil at the rheological fluid. The preceding subject matter of this paragraph characterizes example 2 of the present disclosure, wherein example 2 also includes the subject matter according to example 1, above.

The apparatus further comprises an emergency power assistance system. The emergency power assistance system comprises an actuator coupled to the mount and a pressurized reservoir coupled to the actuator to provide a pressurized fluid to the actuator to apply a force to rapidly move the mount in response to the emergency operating condition. The preceding subject matter of this paragraph characterizes example 3 of the present disclosure, wherein example 3 also includes the subject matter according to any one of examples 1-2, above.

The apparatus further comprises a position sensor to detect a position of the mount. The preceding subject matter of this paragraph characterizes example 4 of the present disclosure, wherein example 4 also includes the subject matter according to any one of examples 1-3, above.

The controller is configured to provide input to the electrical element in response to a signal from the position sensor. The preceding subject matter of this paragraph characterizes example 5 of the present disclosure, wherein example 5 also includes the subject matter according to example 4, above.

The controller is configured to provide input to the electrical element in response to a signal from a thermal sensor. The preceding subject matter of this paragraph characterizes example 6 of the present disclosure, wherein example 6 also includes the subject matter according to any one of examples 1-5, above.

The damper is configured to provide a fail-safe level of damping in the absence of power. The preceding subject matter of this paragraph characterizes example 7 of the present disclosure, wherein example 7 also includes the subject matter according to any one of examples 1-6, above.

Further disclosed herein is a system for variable fluid damping. The system comprises a mount positioned proximate a vehicle doorway. The system also comprises a vehicle door coupled to the mount, the vehicle door corresponding to the vehicle doorway. The system further comprises a damper coupled to the mount to apply a damping force in response to movement of the mount in closing or opening the vehicle door. The system additionally comprises a rheological fluid disposed in the damper. The system also comprises a controller to affect a change in viscosity of the rheological fluid in response to at least one of an emergency operating condition, a near open condition, and a near closed condition. The preceding subject matter of this paragraph characterizes example 8 of the present disclosure.

The system further comprises an electrical element to apply a magnetic field to the rheological fluid in response to a signal from the controller. The preceding subject matter of this paragraph characterizes example 9 of the present disclosure, wherein example 9 also includes the subject matter according to example 8, above.

The damper is coupled to the mount via a drive system. The preceding subject matter of this paragraph characterizes example 10 of the present disclosure, wherein example 10 also includes the subject matter according to any one of examples 8-9, above.

The drive system is a chain and sprocket drive system. The preceding subject matter of this paragraph characterizes example 11 of the present disclosure, wherein example 11 also includes the subject matter according to example 10, above.

The damper comprises a plunger comprising at least one aperture to provide damping by forcing the rheological fluid through the at least one aperture, a viscosity of the rheological fluid providing a corresponding damping effect. The preceding subject matter of this paragraph characterizes example 12 of the present disclosure, wherein example 12 also includes the subject matter according to any one of examples 8-11, above.

The system further comprises an emergency power assistance system to rapidly open the vehicle door in response to the emergency operating condition. The emergency power assistance system comprises an actuator coupled to the mount and a pressurized reservoir coupled to the actuator to provide a pressurized fluid to actuate the actuator to apply a force to rapidly move the mount in response to the emergency operating condition. The preceding subject matter of this paragraph characterizes example 13 of the present disclosure, wherein example 13 also includes the subject matter according to any one of examples 8-12, above.

Additionally disclosed herein is a method of variable fluid damping. The method comprises providing electrical power to a damper. The method also comprises damping movement of a mount with a first damping force. The method further comprises detecting an emergency operating condition. The method additionally comprises reducing electrical power to the damper in response to detection of the emergency operating condition. The method also comprises activating an emergency power assistance system to rapidly move the mount to an open position. The method further comprises damping movement of the mount by the emergency power assistance system with a second damping force less than the first damping force in response to the emergency operating condition. The preceding subject matter of this paragraph characterizes example 14 of the present disclosure.

The method further comprises detecting a position of the mount with a position sensor. The preceding subject matter of this paragraph characterizes example 15 of the present disclosure, wherein example 15 also includes the subject matter according to example 14, above.

The method further comprises damping movement of the mount in at least one of a near open position and a near close position detected by the position sensor. The preceding subject matter of this paragraph characterizes example 16 of the present disclosure, wherein example 16 also includes the subject matter according to example 15, above.

The method further comprises detecting a temperature with a thermal sensor. The preceding subject matter of this paragraph characterizes example 17 of the present disclosure, wherein example 17 also includes the subject matter according to any one of examples 14-16, above.

The method further comprises adjusting the electrical power to the damper based on the detected temperature. The preceding subject matter of this paragraph characterizes example 18 of the present disclosure, wherein example 18 also includes the subject matter according to example 17, above.

Deploying the emergency power assistance system further comprises discharging a pressurized reservoir to an actuator to rapidly move the mount. The preceding subject matter of this paragraph characterizes example 19 of the present disclosure, wherein example 19 also includes the subject matter according to any one of examples 14-18, above.

Damping movement of the mount comprises moving a rheological fluid through an aperture in a damper coupled to the mount. The preceding subject matter of this paragraph characterizes example 20 of the present disclosure, wherein example 20 also includes the subject matter according to any one of examples 14-19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

The apparatuses, systems, and methods described herein enable variable fluid damping of moving structures. Current damping provides a uniform or fixed level of damping based on the fluid used and the structure through which the fluid is passed during damping. The apparatuses, systems, and methods of the present application provide a variable damping technique which provides for dynamic damping of a system, variable operation in response to detected conditions, reduction in weight and cost, and improvement in efficiency.

Figure 1:
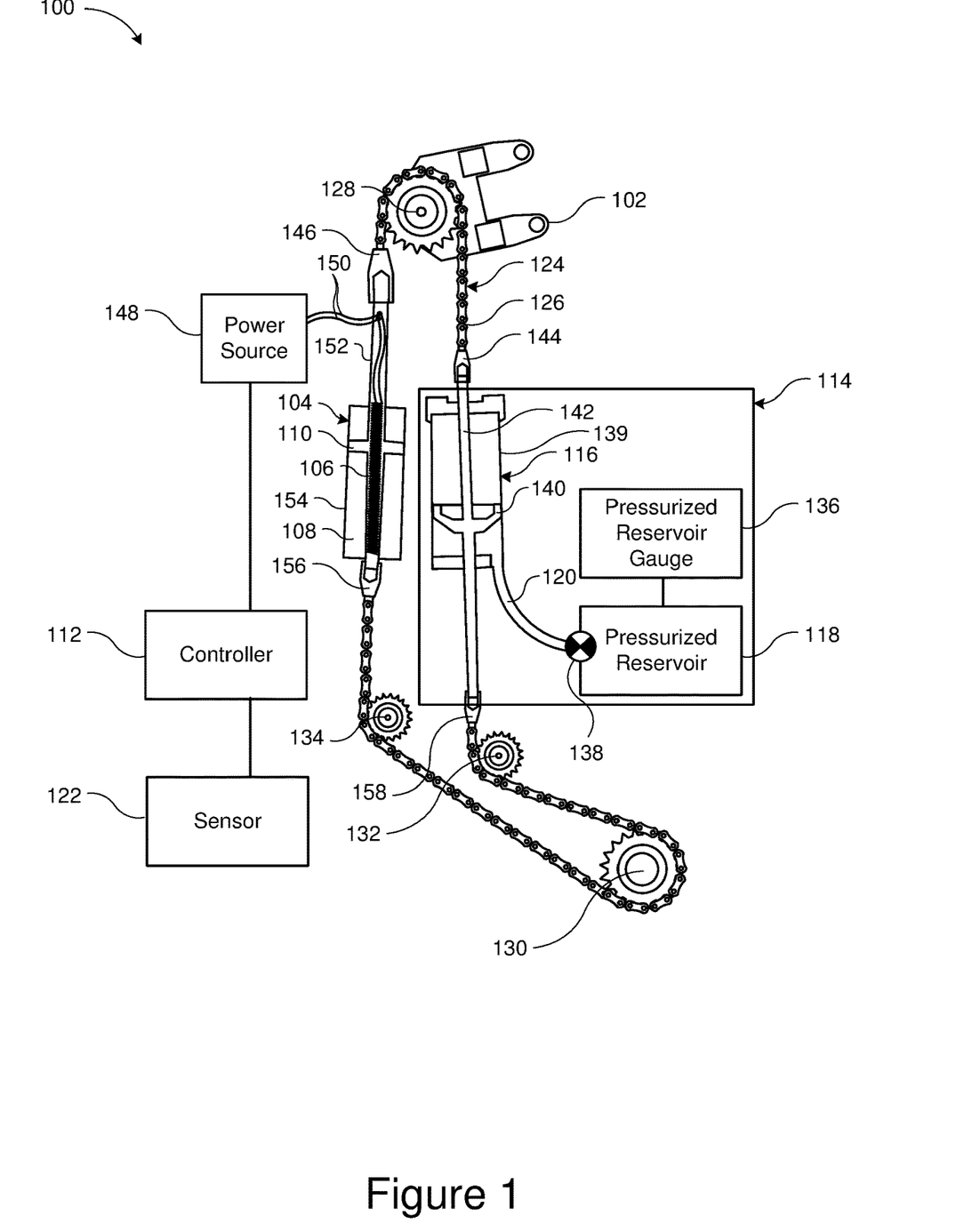
FIG. 1 illustrates a schematic view of an apparatus for variable fluid damping, according to one or more examples of the present disclosure.

Referring to FIG. 1, an example of an apparatus 100 for variable fluid damping is shown. The apparatus 100 may be implemented to provide variable damping in a wide range of applications. The apparatus 100 includes a mount 102. The mount 102 is configured to receive a moveable structure such as a door, lid, hatch, window, tool, arm, or the like. The mount 102 may be configured to receive a bolted or pinned connection or may provide other mounting hardware or structure. The mount 102 may be configured to pivot. In other embodiments, the mount 102 may be configured to translate. In some embodiments, the mount 102 is configured to have multiple degrees of freedom. In the illustrated embodiment, the mount 102 is coupled to a mount sprocket 128. The mount sprocket 128 and the mount 102 may be coupled together such that rotation of the mount sprocket 128 rotates the mount 102 at a ratio of 1:1. Alternatively, another ratio of movement between the mount sprocket 128 and the mount 102 may be incorporated through the use of gearing or other intermediate mechanisms.

A damper 104 is coupled to the mount 102 to apply a damping force in response to movement of the mount 102. The damper 104 includes a damper body 154. The damper body 154 may be cylindrical or have another geometry. The damper 104 also includes a damper shaft 152 which extends through the damper body 154. A damper piston 110 is disposed on the damper shaft 152 to move within the damper body 154 and form at least a partial seal relative to an interior of the damper body 154.

In the illustrated embodiment, the damper 104 is coupled to the mount 102 via a drive system 124. The illustrated example of the drive system 124 includes a chain 126 and a plurality of couplers 144, 146, 156, 158. The chain 126 interfaces with the mount sprocket 128 and connects to the damper shaft 152 at the coupler 146, which can be a mount-side damper coupler. The coupler 146 couples the chain 126 to the damper 104 at one end of the damper shaft 152. The damper 104 also includes a damper piston 110 coupled to the damper shaft 152. The damper piston 110 translates along an interior of the damper body 154. The damper shaft 152 is further coupled to the chain 126 at the coupler 156, which can be a back-side damper coupler, on an opposite end of the damper shaft 152 from the coupler 146. One or both of the damper couplers 146, 156 may be fixed or removeable relative to one or both of the chain 126 and/or the damper shaft 152.

An electrical element 106 is disposed proximal to the damper 104. In the illustrated embodiment, the electrical element 106 is positioned within the damper shaft 152 to be at least partially within the damper body 154. In other embodiments, the electrical element 106 may be positioned outside the damper shaft 152. For example, the electrical element 106 may be positioned to at least partially surround the damper 104. Alternatively, the electrical element 106 may be proximal to the damper 104. The electrical element 106 may be, at least in part, an electrical coil. The electrical element 106 may be configured to output a magnetic field to corresponds to at least a portion of the interior of the damper body 154. In another embodiment, the electrical element 106 may communicate electrical power to an interior of the damper body 154 to apply a current within the damper body 154.

A rheological fluid 108 is disposed in the damper 104 to move past the damper piston 110 of the damper 104 through an aperture 202 (see FIG. 2) to generate the damping force. The rheological fluid 108 is reactive in nature, changing viscosity in response to a change in the output of the electrical element 106 to change the damping force of the damper 104. For example, a change in the magnetic field or other electrical output of the electrical element 106 results in a change in the viscosity of the rheological fluid 108. The change in viscosity of the rheological fluid 108 results in a change in the resistance to movement of the rheological fluid 108 through the aperture 202. The change in resistance results in a change in the damping force applied by the damper 104. The rheological fluid 108 may be a magneto-rheological fluid, an electrorheological fluid, or other reactive fluid.

The apparatus 100 also includes a controller 112 to provide input to the electrical element 106 in response to a normal operating condition or an emergency operating condition. The controller 112 communicates with a power source 148 to change an input from the power source 148 to the electrical element 106. For example, the controller 112 may modify a power level or other power parameter such as frequency, amplitude, current, voltage, or the like. The controller 112 may be positioned to be remote relative to at least one of the power source 148 and the damper 104. The power source 148 may be a DC or AC power source and may be capable of outputting controlled electrical power signals.

In some embodiments, the controller 112 is configured to receive input from one or more sensors 122. For example, the sensors 122 may be configured to determine an operating state of a vehicle or other system with which the apparatus 100 corresponds. For example, the apparatus 100 may be disposed in an aircraft and the controller 112 may receive one or more signals, from the sensors 122, an operator, or another component or system, indicating the normal operating condition. In response to the normal operating condition, the controller 112 may provide a signal to the power source 148 to provide an elevated input to the electrical element 106 causing an elevated resistance to movement of the mount 102. The controller 112 may also receive one or more signals from the sensors 122 or other sources indicating the emergency operating condition. In response to the emergency operating condition, the controller 112 may provide a signal to the power source 148 to provide a reduced input to the electrical element 106 causing a reduced resistance to movement of the mount 102. The indication from the sensors 122 or other sources may be in response to a manual or automatic communication to the controller 112. For example, an operator may manually indicate an emergency operation condition or a normal operating condition. Other operating conditions may also be applied.

The apparatus 100 also includes an emergency power assistance system (EPAS) 114. The EPAS 114 includes an actuator 116 coupled to the mount 102. The actuator 116 includes an actuator body 139 and an actuator piston 140 disposed within the actuator body 139. The actuator piston 140 is coupled to an actuator shaft 142 such that, as the actuator piston 140 translates along an interior of the actuator body 139, the actuator piston 140 translates the actuator shaft 142. The actuator shaft 142 is coupled to the drive system 124 at the coupler 144, which can be a mount-side actuator coupler, on one end of the actuator shaft 142 and the coupler 158, which can be a back-side actuator coupler, at the opposite end of the actuator shaft 142.

The EPAS 114 also includes a pressurized reservoir 118 coupled to the actuator 116 provide a pressurized fluid 120 to the actuator 116 to apply a force to rapidly move the mount 102 in response to the emergency condition. The EPAS 114 applies the force by releasing the pressurized fluid 120 into the actuator body 139 which applies a pressure differential to the actuator piston 140 driving the actuator piston 140 along the actuator body 139 and moving the actuator shaft 142. This moves the drive system 124 and, thus, the mount 102. The use of the pressurized fluid 120 allows the EPAS 114 to provide a relatively rapid movement of the mount 102. The pressurized fluid 120 is stored in the pressurized reservoir 118 until released. The pressurized fluid 120 may be released through a valve 138 or other release mechanism. A pressure within the pressurized reservoir 118 may be monitored and/or displayed by a pressurized reservoir gauge 136.

The pressurized reservoir 118 is sized to provide sufficient force to move the mount 102 and drive system 124. Because the damper 104 is coupled to the drive system 124, the pressurized reservoir 118 is sized to overcome the damping forces of the damper 104 to move the mount at a determined rate. In the embodiments described herein, the variable fluid damping aspect of the damper 104 allows for a reduced viscosity in the rheological fluid 108 during activation of the EPAS 114. The reduced viscosity of the rheological fluid 108 lowers the force required of the EPAS 114 to achieve the determined rate of movement of the mount 102. With a reduced force required of the EPAS 114, the size, weight, and cost of the EPAS is reduced as a thinner pressurized reservoir 118 is necessary, the valve 138 can be less robust, and the capacity and strength requirements of the actuator 116 are reduced. Further reductions in weight and cost may be had throughout the apparatus 100 as reduced forces are necessary from, and produce by, the EPAS 114.

In the illustrated embodiment, the controller 112 is coupled to the pressurized reservoir 118 to detect a release of the pressurized fluid 120 via the valve 138. In some embodiments, the controller 112 may be configured to detect the emergency operating condition and signal the power source 148 to reduce a viscosity of the rheological fluid 108 in the damper 104. The controller 112 may also, in response to detection of the emergency operating condition, provide a soft opening in response to a detected release of the pressurized fluid 120 in which viscosity of the rheological fluid 108 is increased near a full open position of the mount 102 to cushion movement of the mount 102

The controller 112 may also determine other conditions and variable in the apparatus 100. For example, the sensors 122 may be configured to determine a position of the mount 102 either directly or via a position of one or more other components of the apparatus 100 such as a sprocket 128, 130, 132, 134, the damper shaft 152, the actuator shaft 142, or the like. In some embodiments, the controller 112 is configured to provide a level of damping correspond to a position of the mount 102. For example, the controller 112 may be configured to provide a damping profile that has increased damping at and/or approaching a travel limit of the mount 102. Such a damping profile may protect against damage to the apparatus or surrounding structure and/or protect against injury to an operator or other user.

The damper 104 may also be configured to provide a fail-safe level of damping in the absence of power. For example, if the power source 148 fails or becomes damaged, the damper 104 may be configured to provide a level of damping which provides sufficient resistance to reduce damage or chance of harm or reduced resistance to operation of the EPAS 114.

The controller 112 may be configured to adjust a damping level provided by the damper 104 based on a detected temperature at or near the apparatus 100. For example, one or more of the sensors 122 may be thermal sensors. The controller 112 may monitor signals from one or more of the sensors 122 to determine a corresponding damping level. Compensating for changes in temperature may provide a consistent and predictable level of damping and operation of the apparatus across a wide range of temperatures.

In some embodiments, the chain 126 traverses one or more sprockets 128, 130, 132, 134. In the illustrated example, the drive system 124 includes the sprocket 132, which acts as a first idler pulley, and the sprocket 134, which acts as a second idler pulley. The sprockets 132, 134 may be used to maintain a level of tension in the drive system 124, to align the chain 126 with a movement direction of one or both of the damper 104 and the actuator 116, to provide positional or rate of movement information, or the like.

The drive system 124 may also include a programming sprocket 130. The programming sprocket 130 may be used to determine a position of the mount 102, a rate of movement of the mount 102, provide movement in another apparatus or system, or provide feedback or other variables. In some embodiments, one or more of the sensors 122 may be disposed to correspond with the programming sprocket 130 or other sprockets 128, 132, 134 of the apparatus 100.

Figure 2:
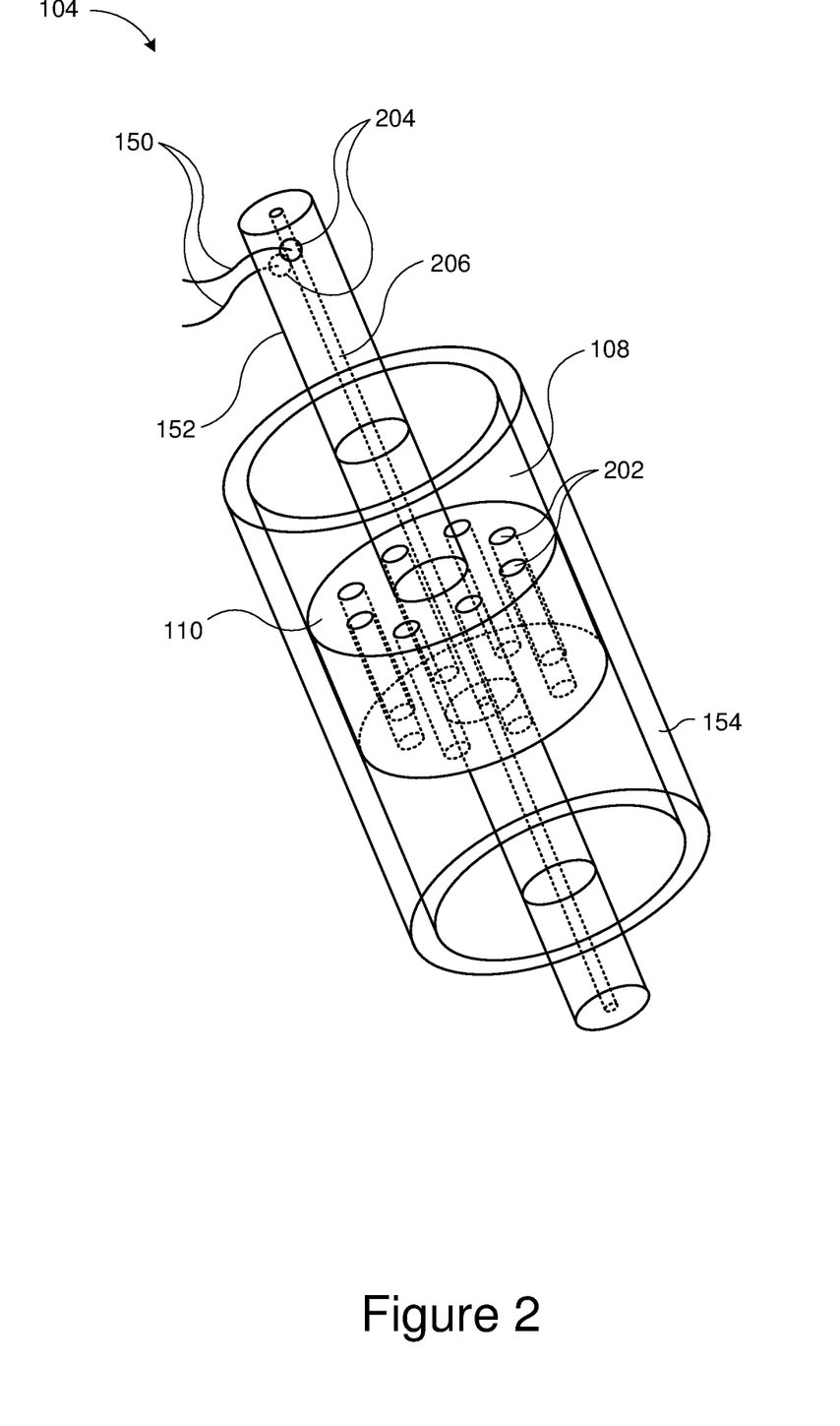
FIG. 2 illustrates a perspective view of a damper of the apparatus of FIG. 1, according to one or more examples of the present disclosure.

Referring to FIG. 2, the damper 104 is shown wireframe with the damper piston 110 within the damper body 154 of the damper 104. In the illustrated example, the damper piston 110 includes a plurality of apertures 202. As the damper piston 110 translates through the damper body 154, the rheological fluid 108 within the damper body 154 is forced through the apertures 202. The viscosity of the rheological fluid provides resistance to movement of the damper piston 110 and the damper shaft 152 to which the damper piston 110 is coupled. In the illustrated embodiment, multiple apertures 202 are formed. Alternatively, only one aperture 202 may be used. Additionally, while the apertures 202 are shown as formed in the damper piston 110, the apertures 202 may be formed in the damper body 154 as channels that extend along an inside of the damper body 154 or that extend outside the damper body 154 from one end of the damper 104 to another, or the like.

In the illustrated embodiment, the damper 104 includes leads 150 that are coupled to the damper shaft 152 or pass into the damper shaft 152. The damper shaft 152 also includes a hollow 206 disposed in the damper shaft 152. The hollow 206 may house the electrical element 106 (omitted for clarity), sensors 122, or other components. In some embodiments, access points 204 are provided on the damper shaft 152 to allow the leads 150 to access the hollow 206. The access points 204 may be openings in the damper shaft 152 or electrical contacts disposed on the damper shaft 152 to couple to corresponding electrical components within the damper shaft 152 (such as the electrical element 106).

Figure 3:
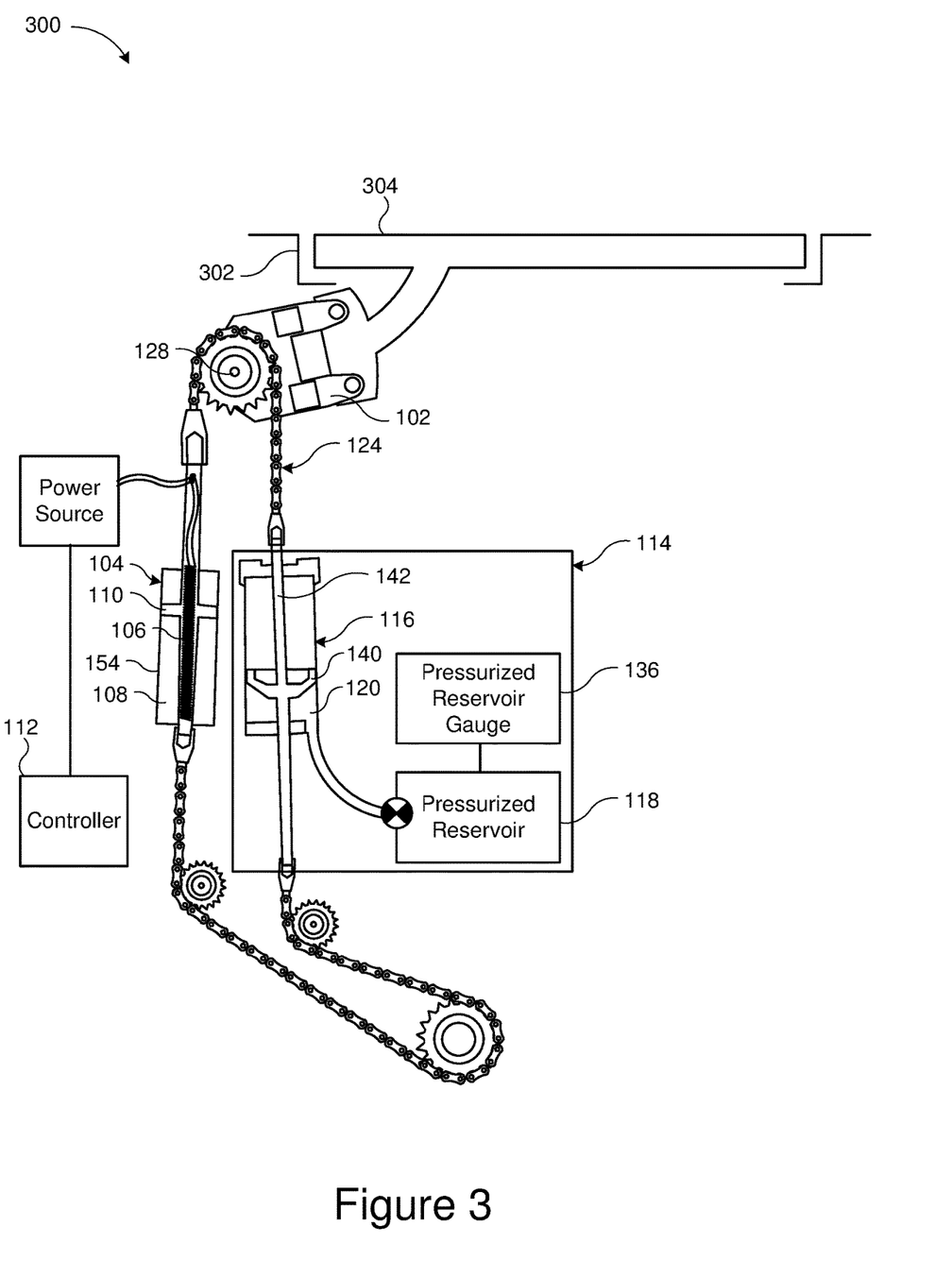
FIG. 3 illustrates a schematic view of a system for variable fluid damping, according to one or more examples of the present disclosure.

Referring to FIG. 3, a system 300 is shown. The illustrated embodiment of the system 300 includes the mount 102 positioned proximate a vehicle doorway 302. The vehicle doorway 302 may correspond to an aircraft, watercraft, or land-based vehicle. The vehicle doorway 302 may be an interior or exterior doorway. The vehicle doorway 302 may be planar or have a curvature. The vehicle doorway 302 may include locks, seals, latches, or the like.

The system 300 also includes a vehicle door 304 coupled to the mount 102 and corresponding to the vehicle doorway 302. The vehicle door 304 is shown as rigidly coupled to the mount 102 but, in some embodiments, may include additional components to pivot, rotate, translate, or otherwise move the vehicle door 304 relative to the mount 102. In some embodiments, the vehicle door 304 includes a switch, lever, latch, or other interface to facilitate manipulation of the vehicle door 304 and/or control or other input to the system 300.

The damper is coupled to the mount 102 to apply a damping force in response to movement of the mount 102 in closing or opening the vehicle door 304. The rheological fluid 108 is disposed in the damper 104 and the controller 112 is configured to affect a change in viscosity of the rheological fluid 108 in response to at least one of an emergency operating condition, a near open condition, and a near close condition.

In the illustrated embodiment, the vehicle door 304 is in a closed or near-closed condition. The controller 112 may be configured to apply a current to the rheological fluid or an electrical element near the rheological fluid to increase a damping force of the damper 104 as the vehicle door 304 closes or when it is closed to reduce a shutting force of the vehicle door 304 or to increase stability or security of the vehicle door 304 against opening.

Figure 4:
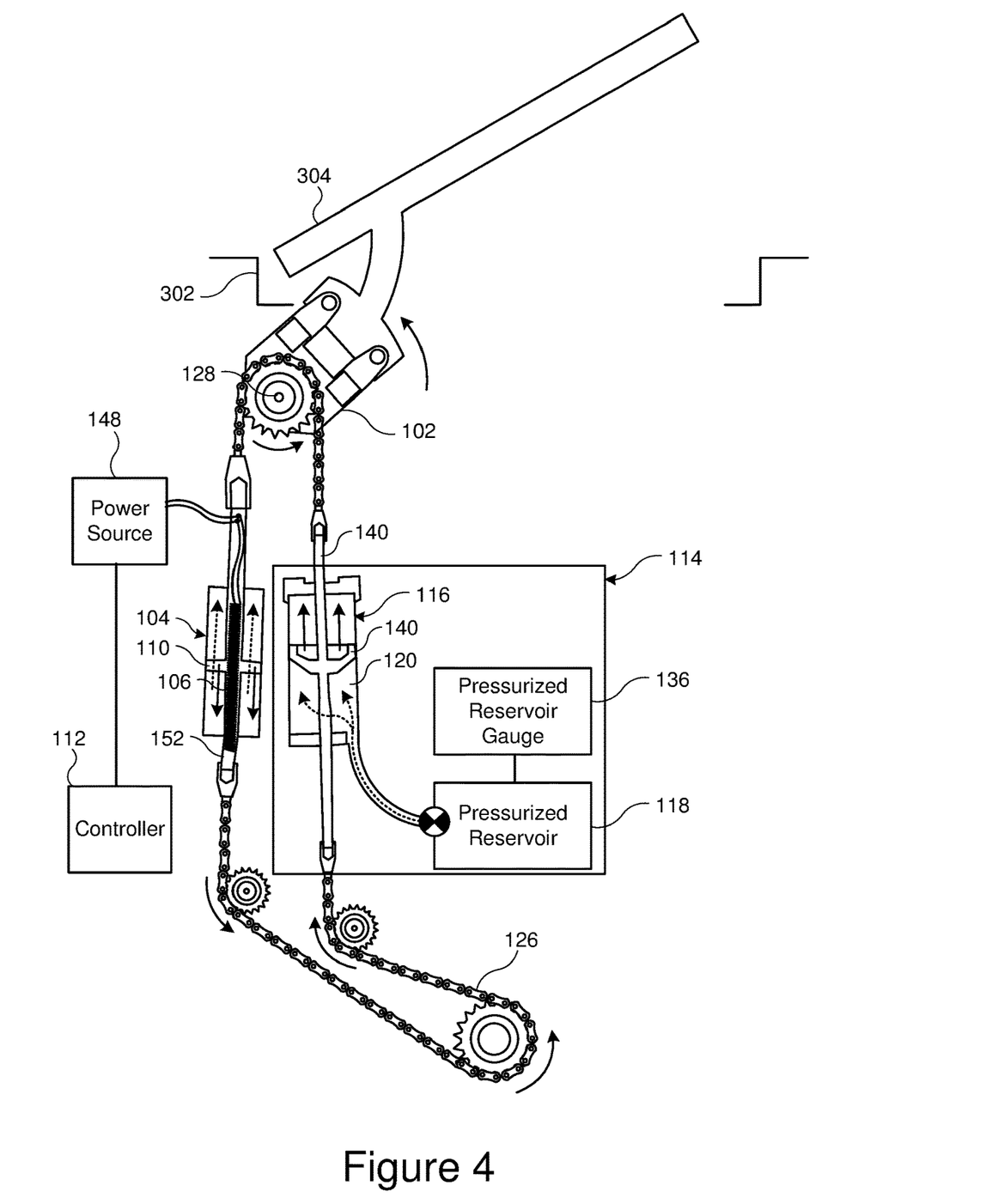
FIG. 4 illustrates a schematic view of the system of FIG. 3, with a door at least partially opened, according to one or more examples of the present disclosure.

As shown in FIG. 4, the mount 102 may pivot to allow the vehicle door 304 to open out of the vehicle doorway 302. In an emergency operating condition, the rotation of the mount 102 is driven by the EPAS 114. In particular, operation of the EPAS 114 includes evacuation of the pressurized reservoir 118 into the actuator 116 which forces the actuator piston 140 and actuator shaft 142 to translate with the actuator 116 and apply tension to the chain 126 which pulls on the damper shaft 152 moving the damper piston 110 through the damper 104 and displacing the rheological fluid 108 within the damper 104 (movement of the rheological fluid shown with dotted lines while movement of the damper piston 110 and damper shaft 152 are shown in with solid lines). In an emergency operating condition, the controller 112 provides a signal to the power source 148 to reduces the viscosity of the rheological fluid 108 allowing the damper 104 to move more freely and allow the chain 126 to move the mount 102 more easily.

As the vehicle door 304 reaches a near-open condition, the controller 112 may signal to the power source 148 to increase the viscosity of the rheological fluid 108 to slow movement of the vehicle door 304 and provide a soft opening or reduce potential damage to the structure of the system 300 or other components, users, or objects. In some embodiments, the controller 112 may be configured to signal an increase in the viscosity of the rheological fluid 108 to hold the vehicle door 304 in an open position to reduce the potential of an accidental closing due to wind, impact, or other influences.

Figure 5:
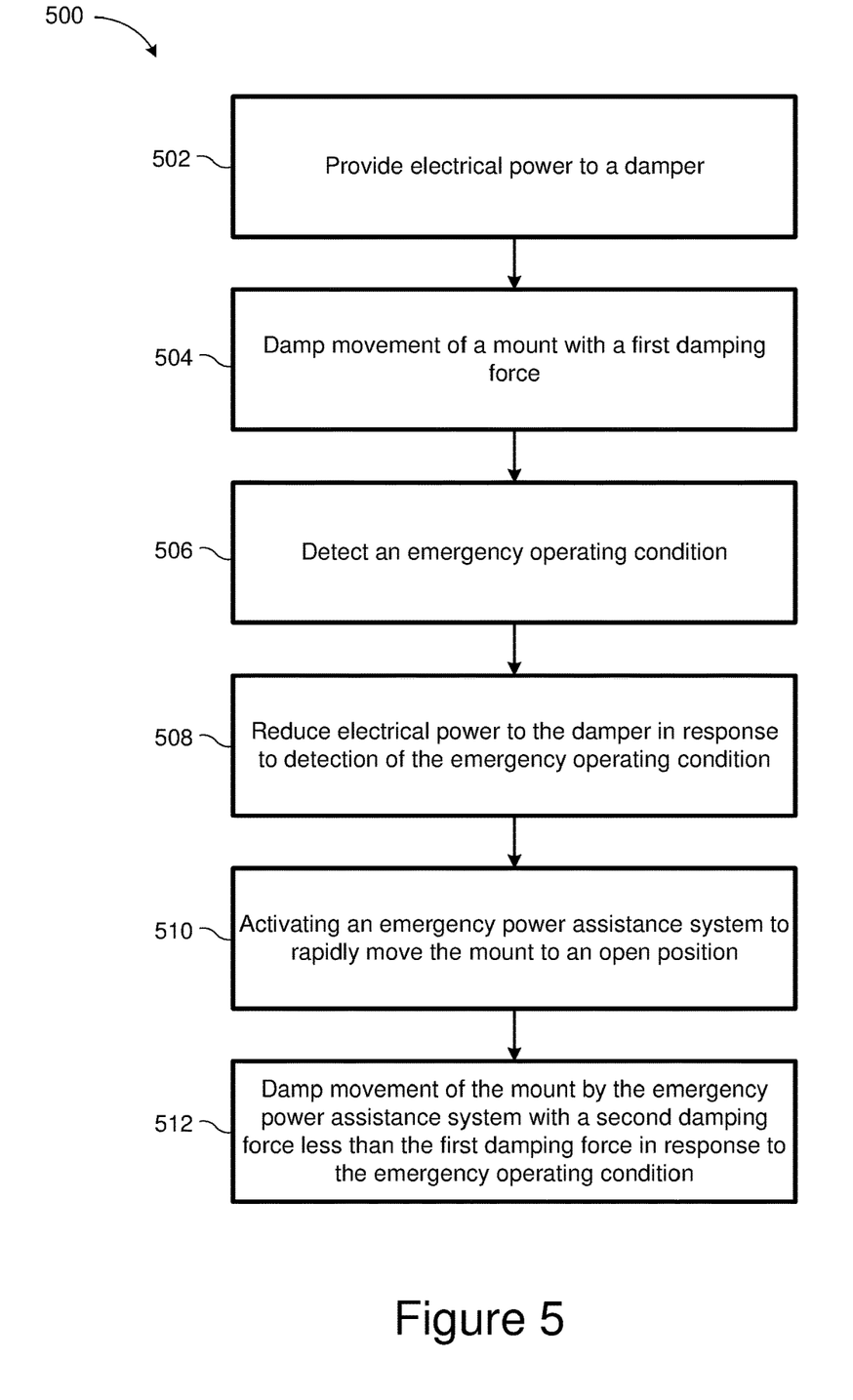
FIG. 5 illustrates a flow chart of a method of variable fluid damping, according to one or more examples of the present disclosure.

FIG. 4 illustrates a flow diagram of a method 500 of variable fluid damping. The method 500 includes providing 502 electrical power to a damper 104. The method 500 also includes damping 504 movement of a mount with a first damping force. The method 500 also includes detecting 506 an emergency operating condition. The method 500 also includes reducing 508 electrical power to the damper 104 in response to detection of the emergency operating condition. The method 500 also includes activating 510 an emergency power assistance system (EPAS) 114 to rapidly move the mount 102 to an open position. The method 500 also includes damping 512 movement of the mount 102 by the emergency power assistance system with a second damping force less than the first damping force in response to the emergency operating condition.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An apparatus for variable fluid damping, the apparatus comprising:
   a mount coupled to a door;
   a damper coupled to the mount to apply a damping force in response to movement of the mount, the damper comprising:
      a damper body;
      a damper piston slidably received within the damper body; and
      a damper shaft coupled to the damper piston, the damper shaft being orthogonal to the damper piston;
   an electrical coil received at least partially within the damper shaft;
   a rheological fluid disposed in the damper, wherein the electrical coil is configured to produce a magnetic field within the rheological fluid and the rheological fluid changes viscosity in response to a change in an output of the electrical coil to change the damping force of the damper, wherein the damping force of the damper is reduced via the electrical coil in an emergency operating condition; and
   a controller to provide input to the electrical coil in response to a normal operating condition and the emergency operating condition.

2. The apparatus of claim 1, further comprising an emergency power assistance system comprising:
   an actuator coupled to the mount; and
   a pressurized reservoir coupled to the actuator to provide a pressurized fluid to the actuator to apply a force to move the mount in response to the emergency operating condition.

3. The apparatus of claim 1, further comprising a position sensor to detect a position of the mount.

4. The apparatus of claim 3, wherein the controller is configured to provide input to the electrical coil in response to a signal from the position sensor.

5. The apparatus of claim 1, wherein the controller is configured to provide input to the electrical coil in response to a signal from a thermal sensor.

6. The apparatus of claim 1, wherein the damper is configured to provide a fail-safe level of damping in the absence of power.

7. A system for variable fluid damping, the system comprising:
   a mount positioned proximate a vehicle doorway;
   a vehicle door coupled to the mount, the vehicle door corresponding to the vehicle doorway;
   a damper coupled to the mount to apply a damping force in response to movement of the mount in closing or opening the vehicle door, the damper comprising:
      a damper body;
      a damper piston slidably received within the damper body; and
      a damper shaft coupled to the damper piston, the damper shaft being orthogonal to the damper piston;
   an electrical coil received at least partially within the damper shaft;
   a rheological fluid disposed in the damper, wherein the electrical coil is configured to produce a magnetic field within the rheological fluid and the rheological fluid changes viscosity in response to a change in an output of the electrical coil to change the damping force of the damper, wherein the damping force of the damper is reduced via the electrical coil in an emergency operating condition; and
   a controller to provide input to the electrical coil to affect a change in viscosity of the rheological fluid in response to the emergency operating condition, a normal operating condition, a near open condition, and a near closed condition.

8. The system of claim 7, wherein the damper is coupled to the mount via a drive system.

9. The system of claim 8, wherein the drive system is a chain and sprocket drive system.

10. The system of claim 7, wherein the damper piston comprises at least one aperture to provide damping by forcing the rheological fluid through the at least one aperture, a viscosity of the rheological fluid providing a corresponding damping effect.

11. The system of claim 7, further comprising an emergency power assistance system to open the vehicle door in response to the emergency operating condition, the emergency power assistance system comprising:
   an actuator coupled to the mount; and
   a pressurized reservoir coupled to the actuator to provide a pressurized fluid to actuate the actuator to apply a force to move the mount in response to the emergency operating condition.

12. A method of variable fluid damping, the method comprising:
   providing electrical power to an electrical coil of an apparatus, wherein the apparatus comprises:
      a mount coupled to a door:
      a damper coupled to the mount to apply a damping force in response to movement of the mount, the damper comprising:
         a damper body;
         a damper piston slidably received within the damper body; and
         a damper shaft coupled to the damper piston, the damper shaft being orthogonal to the damper piston, wherein the electrical coil is received at least partially within the damper shaft;
      a rheological fluid disposed in the damper, wherein the electrical coil is configured to produce a magnetic field within the rheological fluid and the
      rheological fluid changes viscosity in response to a change in an output of the electrical coil to change the damping force of the damper, wherein the damping force of the damper is reduced via the electrical coil in an emergency operating condition; and a controller to provide input to the electrical coil in response to a normal operating condition and the emergency operating condition;

damping movement of the mount with a first damping force based on a magnetic field produced by the electrical power provided to the electrical coil;

detecting the emergency operating condition;

reducing electrical power to the electrical coil in response to detection of the emergency operating condition;

activating an emergency power assistance system to rapidly move the mount to an open position; and damping movement of the mount by the emergency power assistance system with a second damping force less than the first damping force in response to the emergency operating condition.

13. The method of claim 12, further comprising detecting a position of the mount with a position sensor.

14. The method of claim 13, further comprising damping movement of the mount in at least one of a near open position and a near close position detected by the position sensor.

15. The method of claim 12, further comprising detecting a temperature with a thermal sensor.

16. The method of claim 15, further comprising adjusting the electrical power to the damper based on the detected temperature.

17. The method of claim 12, wherein deploying the emergency power assistance system further comprises discharging a pressurized reservoir to an actuator to rapidly move the mount.

18. The method of claim 12, wherein damping movement of the mount comprises moving a rheological fluid through an aperture in a damper coupled to the mount.

19. The apparatus of claim 4, wherein the input provided to the single electrical coil is configured to cause the rheological fluid to become more viscous in response to the signal from the position sensor indicating that the position of the mount is near an open position.

20. The system of claim 7, wherein the input provided to the single electrical coil is configured to cause the rheological fluid to become more viscous in response to the signal from the position sensor indicating that the position of the mount is near an open position.

* * * * *